US008041782B1

(12) United States Patent
Crow et al.

(10) Patent No.: US 8,041,782 B1
(45) Date of Patent: Oct. 18, 2011

(54) SYSTEM OF AUTOMATED CONFIGURATION OF NETWORK SUBSCRIBERS FOR BROADBAND COMMUNICATION

(75) Inventors: James J. Crow, Austin, TX (US); James Kelton, Liberty Hill, TX (US); Arabinda Bose, Cedar Park, TX (US); Jeremy D. Remington, Austin, TX (US); Casey Schmit, Austin, TX (US); Amarjit Singh, Austin, TX (US)

(73) Assignee: Alcatel Lucent, Paris (FR)

( * ) Notice: Subject to any disclaimer, the term of this patent is extended or adjusted under 35 U.S.C. 154(b) by 1316 days.

(21) Appl. No.: 09/653,486

(22) Filed: Aug. 31, 2000

(51) Int. Cl.
*G06F 15/16* (2006.01)

(52) U.S. Cl. ........ 709/220; 709/203; 709/221; 709/222; 709/227; 370/248; 370/252

(58) Field of Classification Search ........... 709/220, 709/223, 224, 225, 227, 222, 228, 230, 250, 709/202
See application file for complete search history.

(56) References Cited

U.S. PATENT DOCUMENTS

| | | | | |
|---|---|---|---|---|
| 5,574,779 A * | 11/1996 | Ely et al. | ........ | 379/221.09 |
| 5,852,722 A * | 12/1998 | Hamilton | ........ | 709/221 |
| 5,901,352 A * | 5/1999 | St-Pierre et al. | ........ | 455/426.1 |
| 5,933,646 A | 8/1999 | Hendrickson et al. | ........ | 395/712 |
| 5,951,694 A | 9/1999 | Choquier et al. | ........ | 714/15 |
| 5,995,999 A | 11/1999 | Bharadhwaj | ........ | 709/200 |
| 6,067,568 A * | 5/2000 | Li et al. | ........ | 709/223 |
| 6,085,120 A | 7/2000 | Schwerdtfeger et al. | ........ | 700/90 |
| 6,091,713 A * | 7/2000 | Lechleider et al. | ........ | 370/248 |
| 6,128,293 A | 10/2000 | Pfeffer | ........ | 370/359 |
| 6,173,326 B1 * | 1/2001 | Collins | ........ | 709/229 |
| 6,188,888 B1 | 2/2001 | Bartle et al. | ........ | 455/417 |
| 6,199,104 B1 | 3/2001 | Delph | ........ | 709/208 |
| 6,209,125 B1 | 3/2001 | Hamilton et al. | ........ | 717/4 |
| 6,215,855 B1 * | 4/2001 | Schneider | ........ | 379/22 |
| 6,237,135 B1 | 5/2001 | Timbol | ........ | 717/1 |
| 6,249,578 B1 * | 6/2001 | Gilles et al. | ........ | 379/207.13 |
| 6,256,772 B1 | 7/2001 | Apte et al. | ........ | 717/1 |
| 6,279,125 B1 | 8/2001 | Klein | ........ | 714/38 |
| 6,285,983 B1 * | 9/2001 | Jenkins | ........ | 705/10 |
| 6,289,381 B1 * | 9/2001 | Brodigan | ........ | 709/225 |

(Continued)

FOREIGN PATENT DOCUMENTS

JP 02001117932 A 4/2001

(Continued)

OTHER PUBLICATIONS

America Online Software version 5.0 screenshots, 1999.*

(Continued)

*Primary Examiner* — Yves Dalencourt
(74) *Attorney, Agent, or Firm* — Hitt Gaines, PC

(57) ABSTRACT

The invention relates to a new system and method for process automation system that allows the conversion of a narrowband consumer Internet user into a broadband (e.g., DSL, ISDN, or Data over Cable) Internet user. In an alternative embodiment, the new system and method is used to configure an original broadband connection. The system includes automation agent software residing on the personal computer that is being configured for broadband communication, and an automation server associated with the manager of the broadband network. The automation agent software guides the user through the steps of testing and ordering the service, automates the configuring of the personal computer for broadband communication, and communicates with the automation server to complete the registration, billing and other administrative processes.

38 Claims, 8 Drawing Sheets

U.S. PATENT DOCUMENTS

| | | | |
|---|---|---|---|
| 6,298,353 B1 | 10/2001 | Apte | 707/103 |
| 6,324,619 B1 | 11/2001 | Raverdy et al. | 711/11 |
| 6,330,006 B1 | 12/2001 | Goodisman | 345/762 |
| 6,381,742 B2 | 4/2002 | Forbes et al. | 717/11 |
| 6,438,744 B2 | 8/2002 | Toutonghi et al. | 717/137 |
| 6,459,773 B1* | 10/2002 | Posthuma | 379/1.04 |
| 6,463,078 B1 | 10/2002 | Engstrom et al. | 370/466 |
| 6,463,079 B2* | 10/2002 | Sundaresan et al. | 370/468 |
| 6,463,578 B1 | 10/2002 | Johnson | 717/124 |
| 6,470,074 B2* | 10/2002 | Teixeria | 379/32.04 |
| 6,473,791 B1 | 10/2002 | Al-Ghosein et al. | 709/217 |
| 6,477,580 B1 | 11/2002 | Bowman-Amuah | 709/231 |
| 6,490,722 B1 | 12/2002 | Barton et al. | 717/174 |
| 6,529,511 B1* | 3/2003 | Du et al. | 370/397 |
| 6,529,784 B1* | 3/2003 | Cantos et al. | 700/79 |
| 6,560,203 B1* | 5/2003 | Beser et al. | 370/252 |
| 6,560,213 B1* | 5/2003 | Izadpanah et al. | 370/338 |
| 6,560,704 B2* | 5/2003 | Dieterman et al. | 713/100 |
| 6,564,377 B1 | 5/2003 | Jayasimha et al. | 717/174 |
| 6,636,329 B2* | 10/2003 | Koppich et al. | 358/1.15 |
| 6,636,505 B1* | 10/2003 | Wang et al. | 370/352 |
| 6,640,239 B1* | 10/2003 | Gidwani | 709/203 |
| 6,643,266 B1* | 11/2003 | Pugaczewski | 370/249 |
| 6,684,242 B1* | 1/2004 | Bahlmann | 709/222 |
| 6,694,350 B2 | 2/2004 | Kurashima et al. | 709/203 |
| 6,704,927 B1 | 3/2004 | Bak et al. | 717/151 |
| 7,334,038 B1* | 2/2008 | Crow et al. | 709/227 |
| 2001/0020249 A1 | 9/2001 | Shim | 709/220 |
| 2002/0095400 A1 | 7/2002 | Johnson et al. | 707/1 |

FOREIGN PATENT DOCUMENTS

| | | | |
|---|---|---|---|
| WO | WO9903036 | 1/1999 | 9/46 |

OTHER PUBLICATIONS http://www.aol.com.*

* cited by examiner

SYSTEM OF AUTOMATED CONFIGURATION OF NETWORK SUBSCRIBERS FOR BROADBAND COMMUNICATION

FIELD OF THE INVENTION

The invention relates generally to the fields of digital communications and computer maintenance, and more specifically to a system and method for configuring personal computer systems for broadband communication.

RELATED ART

As Internet access becomes increasingly important and prevalent in our day-to-day lives, computer component manufacturers, software developers, and Internet service providers ("ISPs") continue to seek faster ways to communicate information across the Internet. The emergence of broadband technology, including DSL, ISDN, cable modems, and other broadband communication schemes are due in large part to this common goal.

"DSL" refers to various types of digital subscriber lines, the two main categories being "ADSL" and "SDSL". DSL technologies use modulation schemes to pack data onto existing copper telephone lines ("POTS"). DSL typically requires a short run to a central telephone office or stations, usually less than 20,000 feet. To access DSL, the user must install and configure a specially-adapted DSL modem.

"ISDN" is an abbreviation for integrated services digital network, an international communications standard for sending voice, video, and data over either digital telephone lines or POTS. ISDN supports data transfer rates of 64 Kbps (64,000 bits per second). Most ISDN lines offered by telephone companies offer two lines called B channels. One line may be used for voice and the other for data, or both lines may be used for data, resulting in data rates of 128 Kbps.

In a "Data over Cable" configuration, a cable modem operates over standard coaxial cable TV lines. Because the coaxial cable used by cable TV provides greater bandwidth than telephone lines, a cable modem can be used to achieve extremely fast access to the Internet. Cable modems that offer speeds up to 2 Mbps are currently available in select areas.

A problem common to all of the various broadband communication techniques is that the user's computer must be specially configured to access the service. Typically, a special modem must be configured, appropriate drivers installed, accounts established and other steps taken to implement the communication link. To compound the problem, all variations of broadband communication may not be available in a given locale. Moreover, because computer systems are very seldom sold ready for broadband communication, configuration often requires a service person to visit the physical location of the computer to configure it for access to a broadband network.

It has therefore become desirable to develop a new, automated method and system for configuring personal computers for broadband communication, as accomplished by the present invention.

BRIEF DESCRIPTION OF THE DRAWINGS

The present invention is illustrated by way of example and not limitation in the accompanying figures, in which like references indicate similar elements, and in which.

DESCRIPTION OF THE PREFERRED EMBODIMENT

The following discussion is intended to provide a detailed description of at least one embodiment of the invention and should not be taken to limit the scope of the invention itself. Rather, any number of variations may fall within the scope of the invention which is properly defined in the claims following this description.

The invention relates to an enhanced system and method for enabling personal computer to access to a broadband communication network using a more streamlined, automated process, as set forth in detail below.

There are many individual requirements for a successful subscription to a consumer broadband Internet service. Each of these requirements must be managed in concert to successfully achieve order fulfillment, software and hardware installation and account establishment. This process may be broken down into individual tasks and automated through the use of a software framework, such as the one described in U.S. patent application Ser. No. 09/542,602, entitled "Broadband Service Control Network," filed Apr. 4, 2000 (the "'602 application"), and incorporated herein by reference in its entirety. The automation framework therein disclosed may be used to control the various detection, testing, configuration and fulfillment tasks to provide a seamless and efficient process flow.

Figure 1:
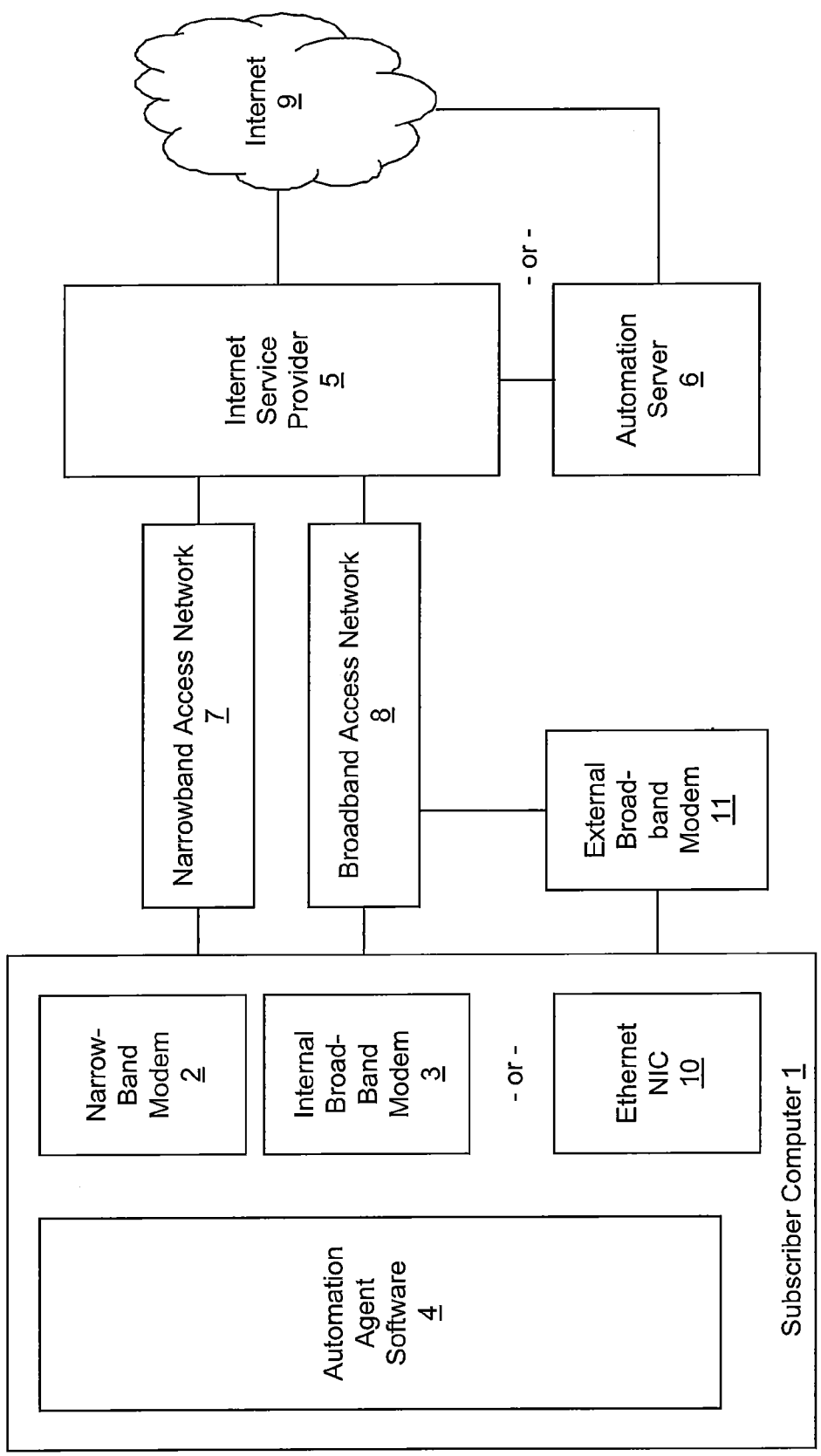
FIG. 1 is an exemplary block diagram of a personal computer's Internet access configuration containing narrowband access systems as well as broadband access systems.

FIG. 1 depicts an exemplary consumer Internet installation, and illustrates the primary requirements for access of a broadband network. This figure illustrates a typical consumer internet access network with both narrowband (analog dial-up modem) and broadband support. The subscriber computer 1 contains a modem that supports narrowband 2 and broadband 3 or 11. In addition, narrowband modem 2 has physical access to narrowband access network 7, and broadband modem 3 or 11 has physical access to broadband access network 8. In this example, the narrowband modem 2 is an industry standard analog modem device commonly used for consumer narrowband Internet access. The narrowband modem 2 utilizes the narrowband access network 7, typically the POTS of the public dial-up telephone network, to gain access to an Internet Service Provider ("ISP") 5 and through that provider, the Internet 9.

Still referring to FIG. 1, the broadband modem device 3 or 11 is an instance of a common broadband modem device installed within the subscriber computer 1. Alternatively, the broadband modem device 11 may be an external device. In the case of the external broadband modem 11, an Ethernet Network Interface Card 10 may be used to communicate with the external broadband modem 11. No distinction is made as to the broadband technology used by the broadband modem 3, 11 or the broadband access network 8. For the purposes of this invention, all broadband Internet access technologies such as IDSL, DSL, and Data over Cable or wireless are equally applicable. Automation agent software 4 will be discussed below in connection with DSL to illustrate the present invention.

Note that the narrowband and broadband networks and access devices are shown to be present together in FIG. 1 with dual access as a possibility. While this is not the typical model, this is possible through dual-modem cards. Furthermore, the present invention allows for the simultaneous presence of narrowband and broadband devices and provides for automated management of the subscriber system to use narrowband as a backup scenario should the broadband connection fail.

ISPs may provide narrowband access, broadband access, or both. Moreover, different types of broadband access may be provided. For purposes of discussion, the ISP 5 in the example is assumed to provide both narrowband access and broadband access to the same network resources, using the same basic subscriber account information. This model allows for minimal impact for the subscriber after the narrowband to broadband conversion. Consequently, the subscriber's email address and other account information would be able to remain the same with only the billing information and physical network details changing between the two access methods.

Also present in this example are automation agent 4 and automation server software 6 modules, which can be of the type described the '602 application, which is incorporated herein by reference in its entirety. The automation agent software 4 may be an embodiment of the "Active Agent" module as described in the '602 application, with additional logic to automate the requested broadband configuration and/or conversion process. Such additional logic is discussed below.

Similarly, the automation server 6 may be an embodiment of the "Service Mediator" module described in the '602 application, with extensions to control the automation agent software 4 in this network. Consistent with the '602 application, two optional deployment models are shown in FIG. 1. The ISP 5 may deploy the automation server 6 directly within its network. This model is indicated by the line connecting the ISP 5 to the automation server 6. Alternatively, the automation server 6 could be located outside of the ISP network and utilize the Internet 9 as its connection mechanism. This model is indicated by the connection lines between the Internet 9 and the automation server 6.

Figure 2:
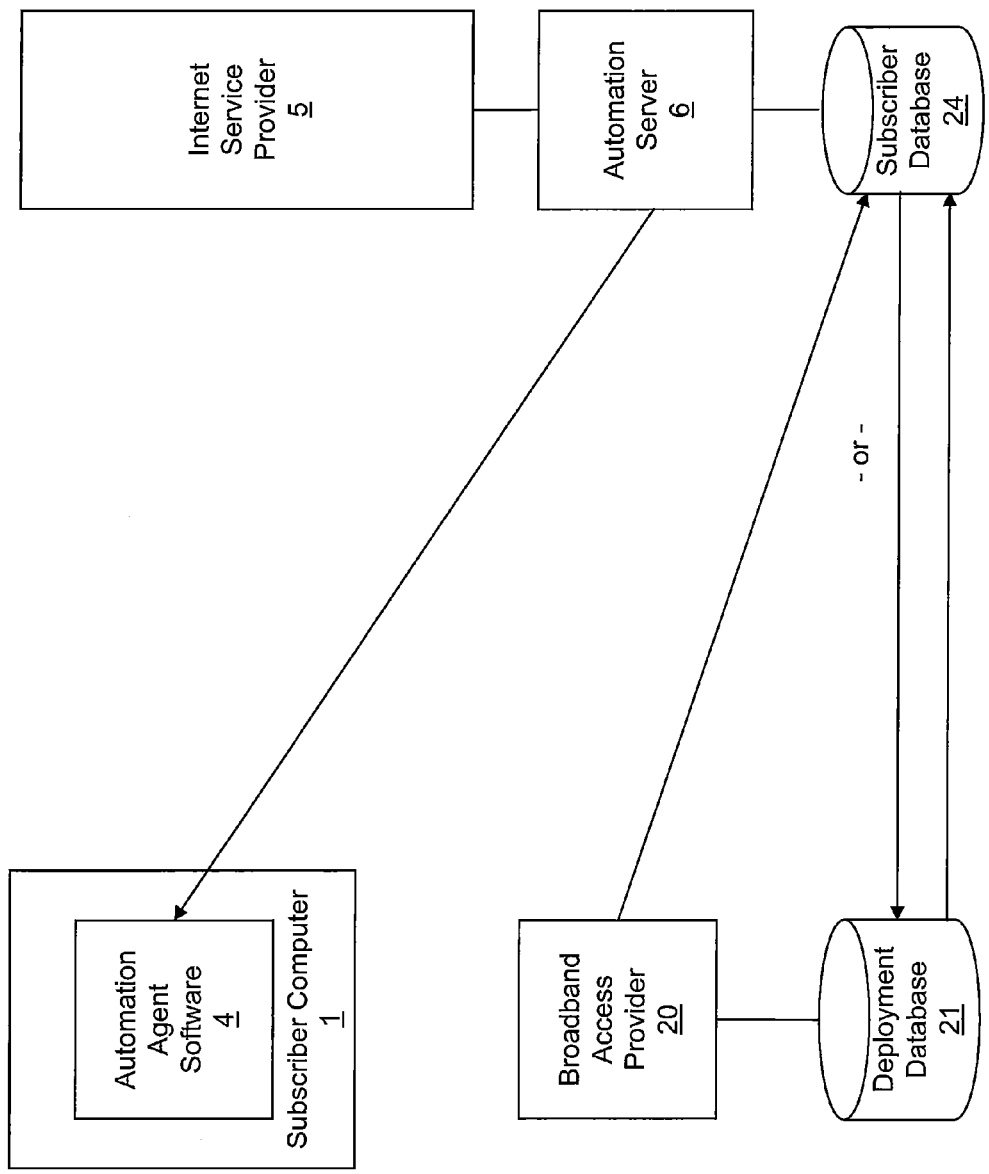
FIG. 2 is a block diagram of an embodiment of the customer acquisition phase of the process automation of the present invention.

FIG. 2 shows the first phase of the automated process—the customer acquisition phase. Broadband networks are typically not deployed to allow 100 percent access to all potential subscribers within a geographic region. Instead, broadband technology is typically deployed in a pattern such that discrete metropolitan areas are enabled for service by a localized upgrade of networking equipment by the broadband access provider. This deployment model means that a set of consumers may not initially qualify for broadband access service but may qualify later in time as the network is systematically upgraded. The process of acquiring this customer in a proactive manner is the initial process automation phase of this invention. Note that there are multiple models for this customer acquisition phase. Existing narrowband customers may be converted to broadband through this mechanism. New installations are also supported where no existing network connection exists and the customer is initially configured for broadband access.

Assume that the broadband network field operations staff has completed the network upgrade and updates the broadband network deployment database 21 to reflect the geographic region of subscribers that have been newly enabled. This information is transmitted to the automation server 6. The information is correlated to individual subscriber information by the automation server 6 and the resulting subscriber records are updated in the subscriber database 24. Personnel of the ISP 5 may determine which of the individual subscribers should be targeted for the broadband upgrade, or it may be done automatically. One set of criteria for this selection may be the subscriber profile database and collection mechanism as described in the '602 application.

An alternate flow for the customer acquisition automation is possible where the automation server 6 directly accesses the broadband deployment database 21. In this model, the subscribers may be qualified against the broadband deployment database 21 as desired by the ISP 5.

The result of this data correlation is a list of consumers within the broadband network that physically qualify for broadband access service. Certain members of this list may be existing narrowband customers who may be targets for conversion to broadband. Other members of the list will be consumers with no existing network access who may be targeted for broadband service initiation. It is assumed that the network service provider will use this list to actively market and engage these customers. As a part of this process, the agent software is made available to the consumer. Several options are possible for this deployment. The software may be actively distributed to the field through direct mailing or marketing methods. The software may also be resident on an interne based host and available for download by the consumer. The software may also be pre-loaded into the consumers PC by the manufacturer. Regardless of the delivery mechanism, the agent software is assumed to be loaded and available on the consumer's machine for the remaining automation processes.

The automation flow continues when a subscriber responds to the service provider's marketing efforts and requests broadband service. Several models exist for the specific flow but it is assumed that the active agent software on the subscriber's machine is activated. The agent software contains information and logic that enables the automation process to proceed during the initial phase where the subscriber machine 1 is not connected to the network. In this phase, the machine is tested and configured for the automation steps that follow. This may include the configuration of a baseline or default network access method. It may also include the detection and use of an existing narrowband access method. In any case, the goal of this automation is to facilitate the connection of the subscriber machine 1 to the automation server 6. This begins a control dialog between the agent 4 and the server 6. In this exemplary description, this dialog is of the nature described in the '602 application.

The dialog between the agent 4 and the automation server 6 is used to guide the subscriber to and step them through a service selection process where the requested broadband service is advertised and selected for purchase by the subscriber. The content and forms required for this direct sales mechanism may be located within the automation server 6 or within any traditional network hosting server within the ISP 5. All of the variables and workflow of this process are managed through the control dialog between the agent 4 and the automation server 6.

In any of the above cases, it is assumed that the subscriber selects a broadband service for purchase. At this point, the automation agent 4 will be notified when the user accepts the service offering through the control dialog with the automation server 6. The next phase of process automation begins when the automation agent 4 receives this signal, and the subscriber installation then proceeds to the qualification stage discussed in connection with FIG. 3.

Figure 3:
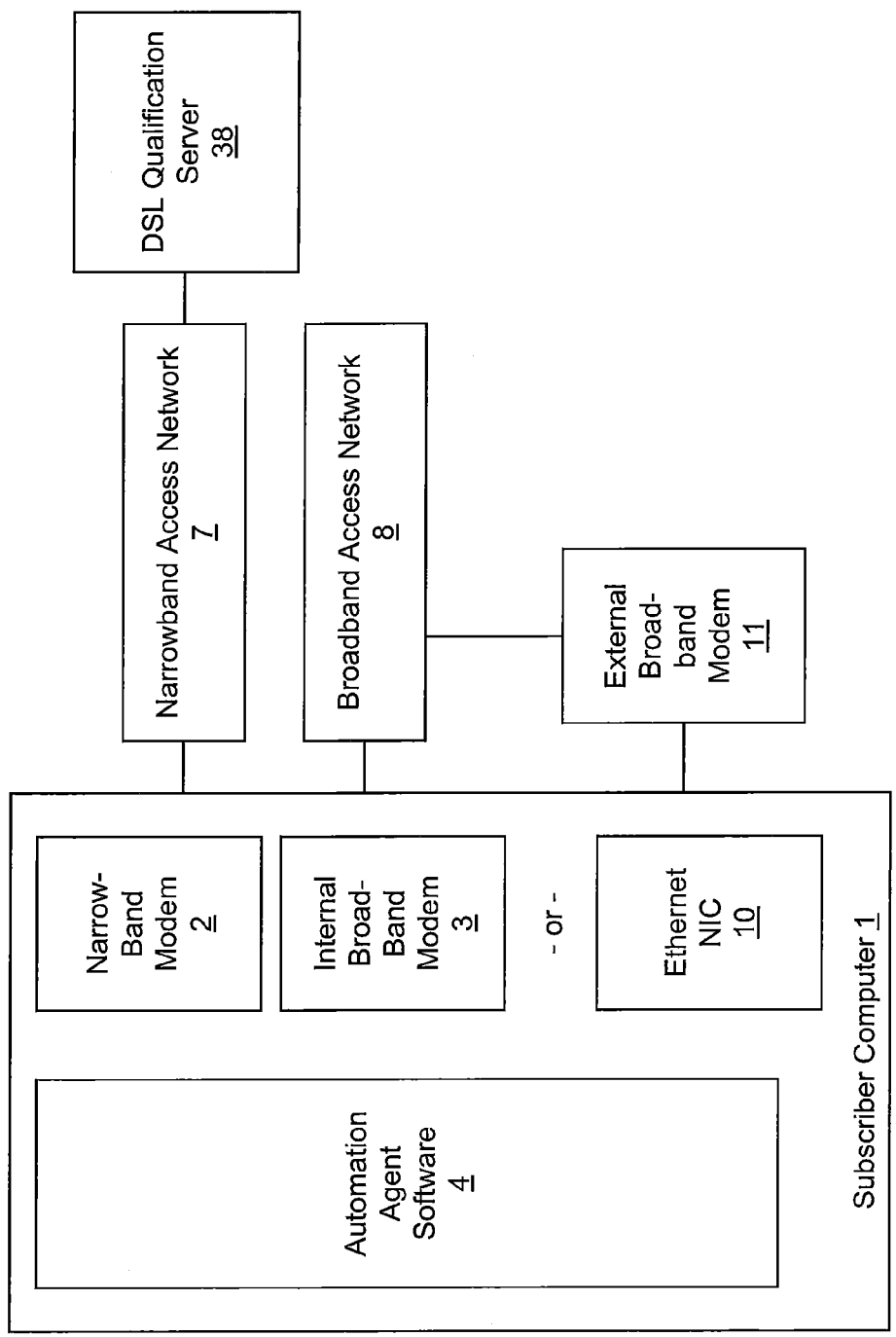
FIG. 3 is a block diagram of the service availability phase of the process automation of the present invention.

FIG. 3 shows an exemplary model for continuing the broadband configuration process by qualifying the subscriber computer and physical equipment for broadband service availability. The variety of service offerings in the previous phase might require differing levels of capability and conditions of the subscriber machine 1 and broadband connection for success. These requirements are contained as a workflow process within the automation server 6, and are communicated to the agent 4 based upon the service that was selected. The automation agent 4 within the subscriber computer 1 is activated to perform this workflow process which represents a series of tasks that have been tailored for the specific broadband access network 8 and service offering desired. The definition of these tasks and the activation sequence may be under the control of a distributed control network, such as the one described in the '602 application. The service availability process could take several forms because it is dependent on the physical broadband media in use. Several options will be described here but it is not intended that all possible scenarios be listed in this document.

The automation agent 4 may be directly integrated with the internal broadband modem 3 or the external broadband modem 11 in such a way as to control and sense this device directly and determine broadband network availability. In other words, the modem 3 or 11 could be instructed by the agent software 4 to access the broadband network physical layer and collect the basic success or failure of this operation as well as the reporting of the various data elements associated with that individual broadband connection. This information will be collected by the agent 4 and communicated to the automation server 6 and/or used locally by the agent 4 to modify the automation workflow. Specifically in a Data over Cable installation, the agent could instruct the cable modem to detect carrier signal from the network and the signal strengths and error codes that were detected during that connection attempt. This information would be collected and used as described above.

An additional test is possible for DSL deployments. The automated agent could use the narrowband modem 2 to contact a DSL line qualification server 38 to test the physical line outside the scope of the broadband access network 8. The subscriber loop characteristics would be collected by the automation agent 4 and used as input to the workflow as described above.

All results of this service availability phase can be processed by the automation agent 4 for basic pass/fail status as well as potential quality of service information to be used during the subscription process. This information is then used to allow a confident decision to be made by the subscriber to purchase the service, and place a service order. Should the subscriber activate the order process, the next automation phase begins to fulfill that broadband service order.

Figure 4:
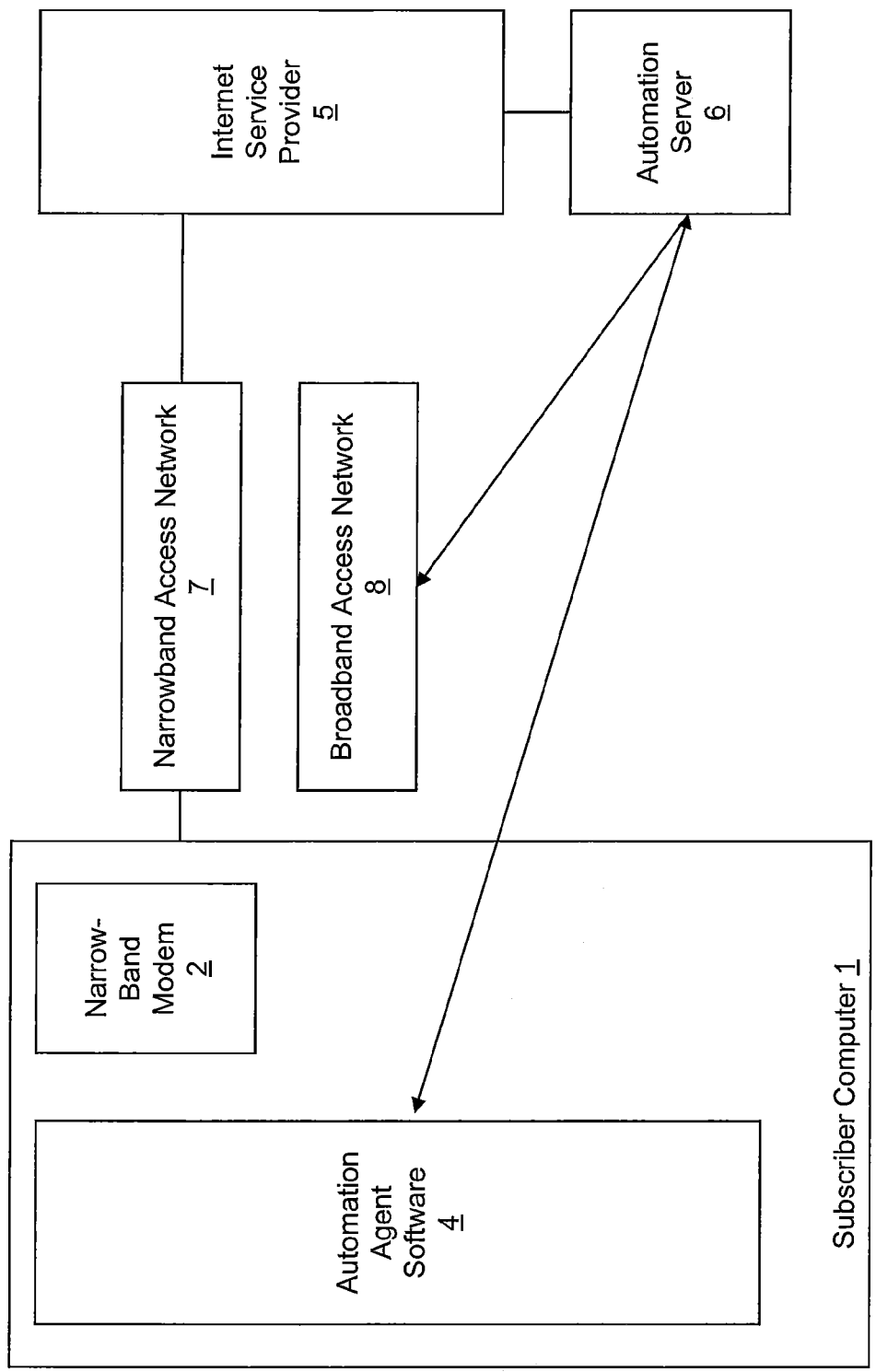
FIG. 4 is a block diagram of the order fulfillment phase of the process automation of the present invention.

As shown in FIG. 4, the next phase of the automated process fulfills the subscriber's order for the broadband service. This step includes all network provisioning, account and billing system updates such that the entire process from order placement to fulfillment is automated from the subscriber's perspective. Typical broadband order fulfillment requires several workdays between order placement and fulfillment. This is due to the fact that there are still individual tasks that must be manually completed by the service provider's field operations group. During this period, it is assumed that the agent software 4 is still resident on the subscriber's machine and is periodically able to establish a connection to the automation server 4 or other control host within the ISP network. The agent software 4 may utilize the dial-up Internet connection using the existing narrowband modem 2 and the narrowband access network 7 to the ISP 5 or the broadband modem device 3 or 11 in its baseline or default configuration mode. The purpose of this connection is to establish the control dialog between the automation agent 4 and the automation server 6 for additional status and workflow instructions as the fulfillment process proceeds.

The automated order fulfillment process begins with the automation agent 4 communicating the order request and all service availability information obtained during the previous automation phase to the automation server 6. The automation server 6 then begins a workflow process to complete the ordering process for all physical network assets as well as all account and billing database updates. The automation server 6 collects all subscriber and broadband modem provisioning and configuration information and transmits this information to the activation agent 4 through the control dialog connection as described above. Note that this final sequence is transmitted only upon successful order fulfillment. If the process fails at any point, the subscriber may be notified of the order status by the automation server 6 and agent 4 dialog process.

Figure 5:
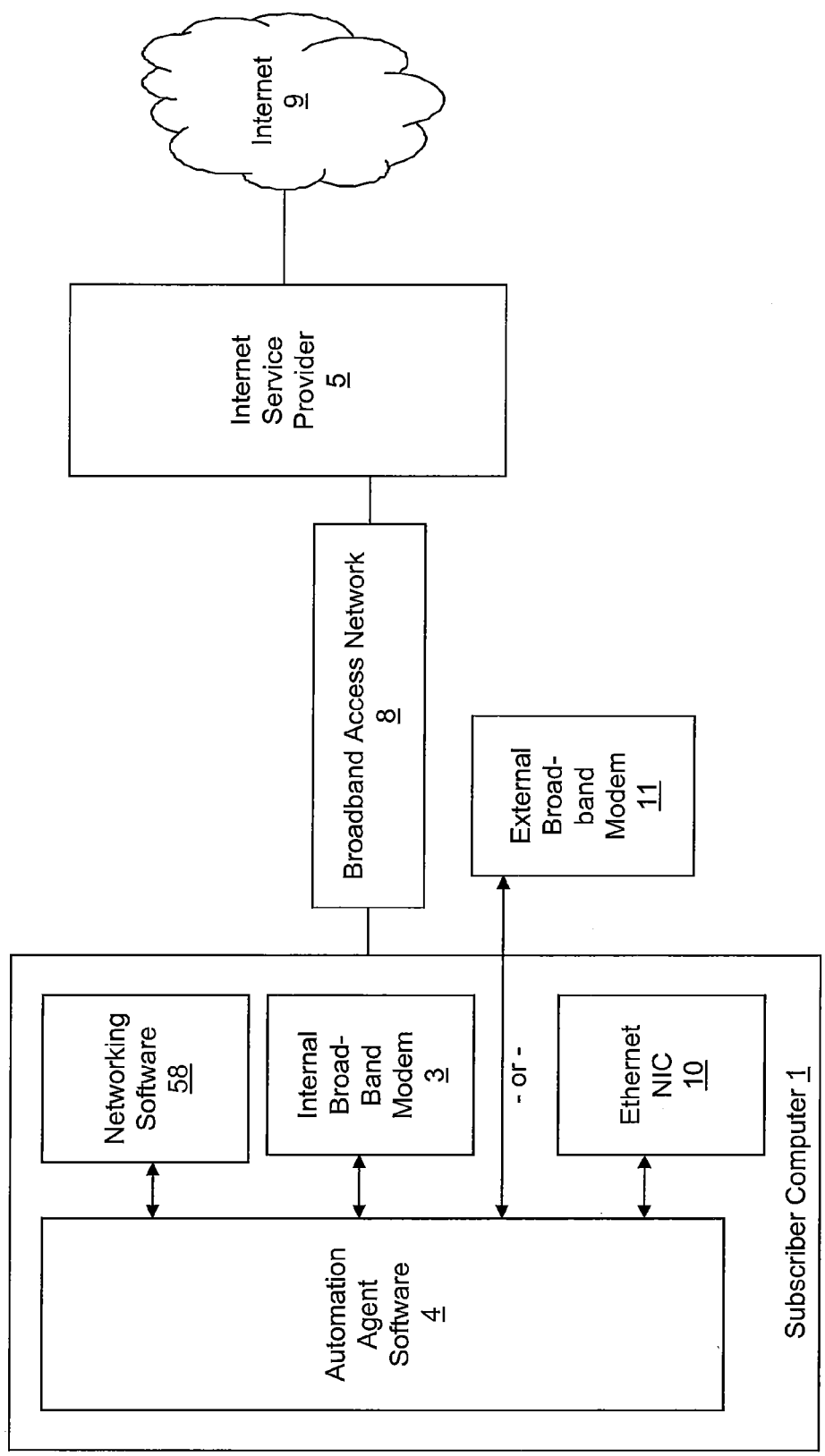
FIG. 5 is a block diagram of the subscriber conversion phase of the process automation of the present invention.

The delivery of the final provisioning and configuration information to the automation agent 4 begins the final automation step of the process. FIG. 5 shows the final step of provisioning all components of the subscriber installation for broadband access and beginning of service. The automation agent 4 uses the provisioning and configuration information delivered by the automation server 6 in the previous phase to configure individual parameters within each of the service affecting modules of the subscriber computer 1. Examples of these modules are listed below but as will be appreciated by one of skill in the art, additional modules are possible and this list is not intended to be complete or all-inclusive.

At a base level, the automation agent can provision the computer networking software 58 for broadband service. All provisioning and configuration information that is required for the broadband modem 3 or 11 to access the network 8 may be directly implemented. The agent 4 software performs this provisioning by directly interfacing to each of the required modules. All network configuration and provisioning is entered into the broadband modem device directly. The various software elements resident within the subscriber machine 1 are directly configured for the desired operation by the agent. This process is contained with a workflow description that has been defined for each of these operations. The agent 4 receives the requested workflow(s) from the automation server 6 via the control dialog as described above. The agent 4 executes this workflow performing all required operations and collecting and reporting all requested status parameters. A record of each workflow step and its resulting status is collected by the agent 4 and forwarded to the automation server 6 for inclusion into the subscriber profile database 24, as shown in FIG. 2.

The automation process terminates with the subscriber computer 1 successfully connecting to the ISP 5 through the broadband network 8.

Figure 6:
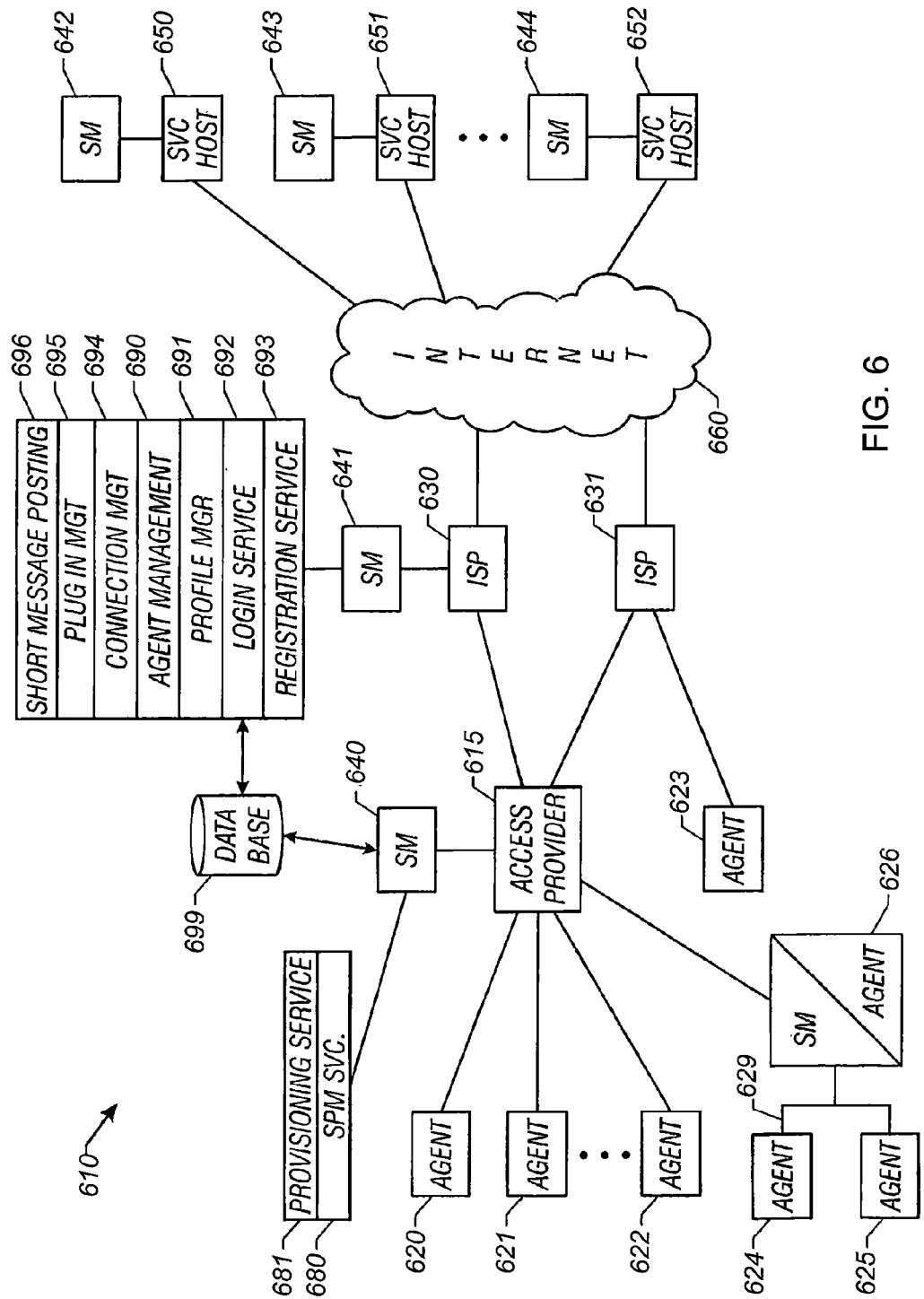
FIG. 6 is an illustrative embodiment of a distributed network environment in which extensible services are dynamically provided to subscriber/agents through a network.

FIG. 6 shows an exemplary distributed network environment 610 in which extensible services are dynamically provided to the subscriber/agents (e.g., 620, 621, 622, 623, 624 and 625) through a network, e.g. an extensible services bus, consisting of the broadband access provider 615, the internet service provider 630, 631, the internet 660, and service offering hosts 650, 651 and 652. As used in the context of FIGS. 6-8, "agent" is an example of the type of service subscriber used in connection with the present invention, where there are numerous other potential subscriber types, such as client machines, desktop or laptop computers, "thin" terminals, etc. Service mediator machines 640, 641, 642, 643, 644 and 626 are present in the network and establish communications dialogs with agents and other Service mediators for service control within this network. The location of individual machines within the Service Network is established using a dynamically updated service address information element distributed across a framework of standardized interconnection mechanisms (such as described in the co-pending applications referenced above). In such a network, the process of connecting an agent 620 to the services it wants to use must satisfy diverse requirements for performance, flexibility, scalability and manageability. From the perspective of the service host 650 or ISP 630, the flexibility and scalability requirements must be considered foremost, especially on the server side of operations where the number of agent requests per task, and the complexity of the tasks themselves, should be simplified. Embodiments of the present invention allow for the dynamic addition of new services that meet the rules for the distributed services network (the bus interface rules), whether the service resides at a server machine (e.g., 650), agent machine (e.g., 620), ISP (e.g., 630), within the access network 615 or elsewhere. Likewise, new agents may readily be added to the network. Shown in FIG. 6 is an exemplary embodiment of a distributed services network wherein a certain minimum service functionality is provided to any subscriber, such as agent 620, by way of a registration service 693 for new agents, a login service 692 for existing agents, subscriber profile database services 691, agent connection services 694 and agent management services 690. Through this network, a subscriber (at agent machine 620, for example) can access these services as well as additional services (e.g., new services added to Service Mediator 641 or 642) as they are added to the network. It will be appreciated that the allocations of services in embodiments of the present invention need not follow the distribution across servers illustrated in FIG. 6, but can be regrouped, consolidated or arranged in alternate configurations without departing from the scope of the present invention.

As shown in FIG. 6, the typical user of the distributed services network is an Internet Service Provider ("ISP") 630 using broadband subscriber connections, although the technology is broadly applicable for use on other sites, including remote servers (e.g., 650, 651, 652) or agent machines (e.g., 623). Regardless of where the services reside, it is helpful to think of each of these operating environments as a self-contained functional unit, or a "sphere." For example, there is the ISP Sphere 630, which includes all the hardware at the ISP's site, and the various Subscriber Spheres (e.g., 620, 621, 622), which include the hardware at the subscriber sites. Additional spheres may be connected such as the broadband access provider Sphere (e.g., 615) which includes all networking hardware and service machines needed to provide broadband carriage of data.

Though not shown explicitly in FIG. 6, each subscriber sphere which uses the distributed services network includes a service point map (SPM) functionality that tracks the location and status of services within the distributed services network 610. In an exemplary embodiment, the SPM is the basic unit of communication used to notify agent machines (e.g., 620, 621, 622, 623, 624, 625) of the location of individual service mediator machines (e.g., 640, 641, 642, 643, 644, 626) within the network 610. The SPM mechanism is also used by individual service mediator machines (e.g., 640) to establish the location of other service mediation machines (e.g., 644, 643) within the network 610. The concept of SPM is dynamic and may be tiered to allow extension of basic functionality.

Most of the subscribers (e.g., 620, 621, 622) are likely to be individuals, but many will be connecting internal LANs 629 to the distributed services network 610 via the connection through the gateway or server 626. In the latter case, it may be desirable to host some portion of a service mediator on the subscriber's LAN 629. In this case, the agent machine 626 contains both agent and service mediator functionality. It provides service mediator functionality to the agent machines 624, 625 that are locally connected.

Some of the services that the ISP 630 wants to offer to the subscriber (e.g., 620) may involve direct connections between services that are not part of the distributed services network. These may be traditional services such as SMTP and POP email transport or may be extension to services controlled by the distributed services network 610.

Figure 7:
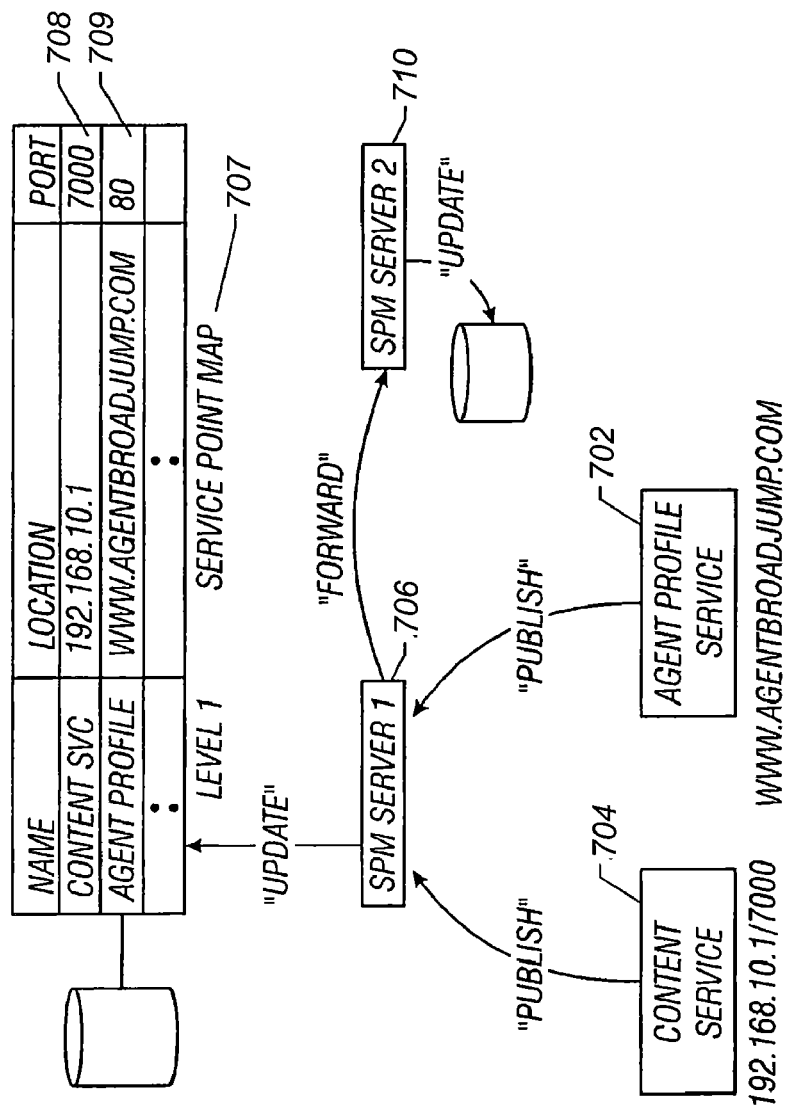
FIG. 7 illustrates a service advertising aspect of an illustrative embodiment of the disclosure.

FIG. 7 illustrates a service advertising aspect of an illustrative embodiment of the present invention. As shown in FIG. 7, when a service (e.g., 704) "joins" the distributed services network, it "advertises" itself by "publishing" a listing at a special service on the network. This listing defines what service it provides and where it can be contacted. The form of the service addressing information used throughout the distributed services network is called a service point map (SPM) 707. Each process in any connected sphere 702, 704 that implements a service has an entry 709, 708 in an SPM 707. The base services have entries in the "Level 1" or "Top Level" SPM. In an exemplary embodiment, the SPM 707 is hosted and maintained by a designated service mediator 706 (e.g., FIG. 6, 640) which is the entry point into the distributed services network for most "join" operations, all base service "joins" and any non-first-time agent "joins."

While several methods of pre-defining the service location exist, two methods are shown in the example of FIG. 7. The content service is identified by a specific IP address and port value pair. The agent profile service is located using a standard URL format and relies of DNS resolution by those seeking service. FIG. 7 also shows the distribution of the SPM across multiple SPM service machines. Upon an update of the SPM by service machine 706, the updated map is forwarded to additional SPM service machines 710 for immediate use.

As shown in FIG. 6, multiple Service Mediator machines may be present, each with their own SPM service 706 for identifying the locations of the various services to the distributed services network. This allows the Service Mediators (e.g., 702) as well as the service machines (e.g., 704) to be partitioned by resource connection as discussed below.

Referring again to FIG. 7, a service (e.g., a content service) begins operations when the server 704 becomes aware that it is supposed to start a server application that implements that service. The server 704 uses the appropriate operating system dependent functions to start registration service. The service constructs an SPM entry for itself during this initialization. The SPM entry contains the service name, version number, and network connection information for the specific instance, or server 704. The SPM entry is submitted to the SPM management service 706 and stored as an entry 708 in the SPM 707, at which time the content service is said to be "active," implying that it is available to service requests.

When a server 704 shuts down, it notifies the SPM service 706 with a list of the SPM entries that it had as "active", and the SPM service 706 removes them from the Level 1 SPM 707. Entries will also be removed in the case that a server becomes unreachable.

In distributed services networks where large numbers of agent instances may be connected at any one time, embodiments of the present invention allow services to be strategically partitioned or distributed to provide scalability to the overall architecture of the network. As described in the co-pending applications incorporated by reference hereto, service point maps are useful for distributing and allocating the available services to any subscribers to the distributed services network. Although various embodiments include "blind" generation and distribution of SPM's to agents (i.e., all SPM entries received from the services are included in the SPM that is distributed to the subscriber machines), embodiments within the scope of the present invention also encompass intelligent generation of SPM's whereby only selected available services are included on an SPM at any given time. Embodiments also allow for intelligent use of the SPM to actively choose or process the selected SPM entry based on service qualification information. For example, available services may be dimensionally partitioned so as to separate the operational tasks into as many discrete and independent code paths as is practically possible. Several such partitioning methods exist, which allow services to be implemented separately on separate servers, allow multiple servers to be implemented on a single server, or allow more than one server to provide a service. Through the use of tiered service location through dynamic SPM generation and dynamic selection from within a specific SPM, services may be partitioned by specific resource requirements, services may be pooled into equivalent peers for load balancing and services may be selected based upon some real-time element of the data or transaction being processed.

Figure 8:
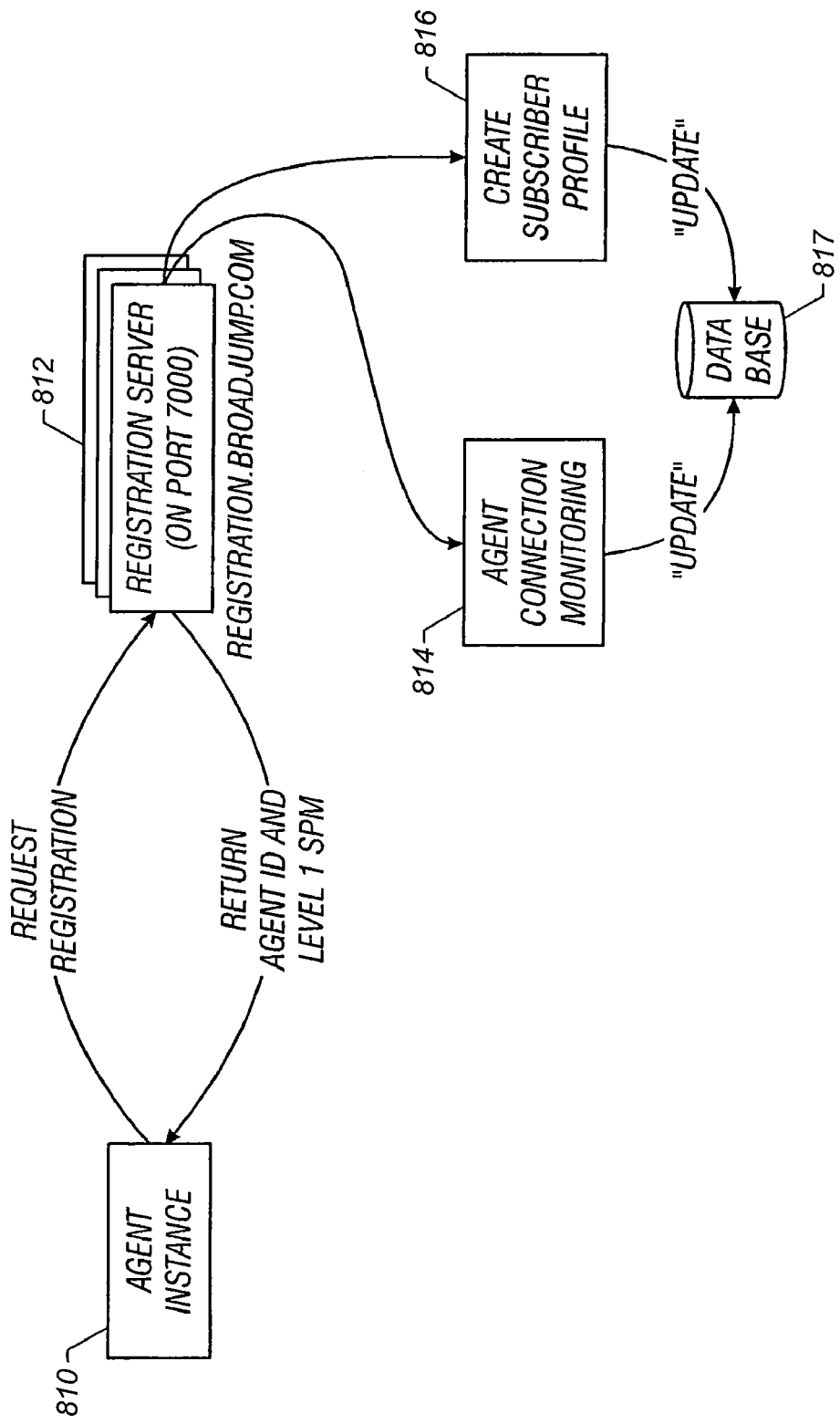
FIG. 8 illustrates an agent registration aspect used in an illustrative embodiment of the disclosure.

FIG. 8 shows an agent registration aspect used in an illustrative embodiment of the present invention. According to the registration aspect, when a subscriber runs the distributed services agent for the first time, the agent instance establishes its place in the distributed services network by contacting a centralized registration service. This mechanism allows for the agent software to be distributed in a generic form across the entire services network. When the generic agent registers, it may be customized by the service mediator machines as needed. The service mediator may qualify the agent by some means such as network location or user name, and automatically deliver the specific appearance or functionality to that agent instance.

In accordance with the selected embodiments shown in FIG. 8, when an agent 410 is connected to the distributed services network for the first time, the agent instance 410 establishes its place in the network by contacting the registration service server 412. The registration service generates an agent-ID for the new agent instance. The agent-ID value is unique in time and space, so that multiple registration servers can implement the registration service without the need for shared state, thus enabling partitioning by equivalency. The registration service at server 412 then collects a current Level 1 SPM (see SPM 707 in FIG. 7) from the service point map service server (see FIG. 6, SPM service 80) and supplies this to the agent 410. This enables the agent 410 to contact the services identified on the SPM 707, effectively completing the connection process. The SPM selected for the new agent instance is dynamic and may be determined by arbitrary analysis of the agent. This further allows for generic agent software to be distributed across the network and be specifically directed to certain service mediators at the time of registration.

As also shown in FIG. 8, the registration service creates a new entry in the subscriber profile database 817 (see also database 199 in FIG. 6) using the profile creation service 816. The profile created for the agent instance 810 is based upon the agent-ID so the agent will be recognized on subsequent logins. This profile is maintained and extended over the lifetime of the agent such that it reflects the current state and status of that agent and all services to which the agent has subscribed. In addition, any subscriber data that is required for access to the distributed services network may be collected. This "subscriber profile" data is largely customer defined, but it is limited to highly static data such as the subscriber's name and address, the level of service the customer has purchased, and runtime control properties. An example of the last type would be the name and type of the subscriber's mail servers.

The manner of collection of this profile data is flexible in that it can be either pre-registered or collected at installation time. When the pre-registration method is used, a data entry application is used to create the agent's profile and fill it with the information that is available at the time. When the installation takes place, the install process asks the installer for some key data, such as a work order number, or the subscriber's name and address. This key data is used to find the partially completed entry, which is then updated with items such as the agent-ID. Other possible install time data might be subscriber system configuration information.

As shown in FIG. 6, the registration service 693 may optionally use a provisioning data service 681 for retrieving data that was entered about the subscriber prior to the registration of this agent instance. This provisioning service maintains entries that have been prepared during the process of arranging for installation at the subscriber's site such as during the order entry process. The database contains basic network and service related information specific to an individual in the network. This data is searchable on any field, so the installation tool need only be provided with enough detail to uniquely identify the pre-registered subscriber, e.g. a work order number, a name and address, etc. The provisioning data service 681 may also maintain a connection to the subscriber profile query service 691 so that it can support multiple agent program initializations for a single subscriber. The two common reasons for multiple initializations are that the subscriber is using more than one machine, and when the agent program is reinstalled without using a previously assigned agent-ID.

Once the registration of the agent instance 810 is complete, the registration service 812 also sends an "update" message to the agent connection monitoring service 814 (see also FIG. 6, Connection Management 694) to notify the service that the agent-ID is "active." The database 817 (see also FIG. 6, 699) is updated to reflect the current connectivity status of each individual agent in the network.

The foregoing discussion is included to demonstrate preferred embodiments of the invention. It should be appreciated by those of skill in the art that the structure and techniques disclosed in the examples above represent structure and techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention, which are set forth in the claims to follow.

What is claimed is:

1. An automated method of a service provider establishing broadband service with a subscriber, comprising the steps of: receiving an order for broadband service from said subscriber, including establishing a control dialog between an automation server and a subscriber computer, said establishing including providing an automation agent to said subscriber, said automation agent being configured to configure said subscriber computer to initiate a control dialog with said automation server, wherein said order includes a service option;
configuring said automation agent to execute a configuration workflow, including transmitting said workflow to said automation agent via said control dialog, said workflow being based on said service option and including conditions for said subscriber computer to operate over said broadband service, said automation agent being further configure to perform said workflow and to determine broadband service availability information;
configuring physical assets of a broadband network by employing said automation server to receive said service availability information from said automation agent, and to configure said physical assets based on said order and said service availability information;
configuring said subscriber computer by providing to said automation agent, via said control dialog, subscriber and broadband modem configuration information, wherein said automation agent is further configured to provision said subscriber computer and said broadband modem according to said configuration information; and transmitting to said automation agent a copy of an extensible service location map of an extensible service bus, wherein said extensible service location map includes a listing of a plurality of extensible services included on said extensible service bus and server location information corresponding to each extensible service of the listing.

2. The method as recited in claim 1, further comprising the step of upgrading said broadband network to add a geographic region that includes said subscriber, thereby newly enabling said subscriber for broadband network access.

3. The method as recited in claim 2, wherein establishing said control dialog further includes said automation server accessing a broadband deployment database updated after said upgrading.

4. The method as recited in claim 1, wherein said service provider provides said automation agent via an internet download to said subscriber.

5. The method as recited in claim 1, wherein said service provider provides said automation agent to a computer manufacturer for preloading on said subscriber computer.

6. The method as recited in claim 1, wherein said automation agent is configured to configure said subscriber computer for a baseline network access method to conduct said control dialog.

7. The method as recited in claim 1, wherein receiving said order includes said service provider advertising, via said automation agent, said broadband service to said subscriber.

8. The method as recited in claim 1, wherein said control dialog includes said automation server receiving a status from said automation agent resulting from executing said workflow, and said automation server updates a subscriber profile database with said status.

9. The method of claim 1, wherein said broadband network is a DSL network.

10. The method of claim 9, wherein said workflow includes using a narrowband modem to contact a DSL line qualification server to test a physical line outside the scope of said broadband network, and wherein said service availability information includes DSL subscriber loop characteristics associated with said physical line.

11. The method of claim 1, wherein said broadband network is a cable network.

12. The method of claim 11, wherein said workflow includes detecting a carrier signal from said cable network and attempting to communicate with said automation server via said cable network, and said service availability information includes a signal strength of said carrier signal or an error code resulting from said attempt.

13. The method of claim 1, wherein said broadband network is an ISDN network.

14. The method of claim 1, wherein said broadband network is a wireless network.

15. An automated method of establishing broadband service between a subscriber and a service provider, comprising the steps of:
providing an order for broadband service from said subscriber, including establishing a control dialog between an automation server and a subscriber computer, said establishing including receiving an automation agent from said service provider, said automation agent being configuring configured to configure said subscriber computer to initiate a control dialog with said automation server over a network, wherein said order includes a service option;
performing a configuration workflow received from said automation server via said control dialog, said workflow based on said service option and including conditions for said subscriber computer to operate over said broadband service, said performing including determining broadband service availability information;
configuring said subscriber computer by receiving from said automation server via said control dialog subscriber and broadband modem configuration information, wherein said automation agent is further configured to provision said subscriber computer and said broadband modem according to said configuration information; and
transmitting to said automation agent a copy of an extensible service location map of an extensible service bus, wherein said extensible service location map includes a listing of a plurality of extensible services included on said extensible service bus and server location information corresponding to each extensible service of the listing.

16. The method as recited in claim 15, wherein said automation agent is configured to instruct a cable modem connected to said subscriber computer to detect a carrier signal from said network.

17. The method as recited in claim 15, wherein said automation agent is configured to command a narrowband modem connected to said subscriber computer to test a physical line outside the scope of a broadband network.

18. The method as recited in claim 15, wherein said automation agent is configured to receive from said automation server broadband modem provisioning and configuration information.

19. The method as recited in claim 15, wherein said automation agent collects a status resulting from executing said workflow, and provides said status to said automation server via said control dialog.

20. The method of claim 15, wherein said network is a broadband DSL network.

21. The method of claim 20, wherein said network is a broadband network, and said workflow includes using a narrowband modem to contact a DSL line qualification server to test a physical line outside the scope of said broadband network, and wherein said service availability information includes DSL subscriber loop characteristics associated with said physical line.

22. The method of claim 15, wherein said network is a broadband cable network.

23. The method of claim 22, wherein said workflow includes detecting a carrier signal from said cable network and attempting to communicate with said automation server via said cable network, and said service availability information includes a signal strength of said carrier signal or an error code resulting from said attempt.

24. The method of claim 15, wherein said network is a broadband wireless network.

25. An automation server for establishing broadband service between a subscriber and a service provider, comprising:
a processor for executing instructions;
a memory for storing said instructions, wherein said instructions comprise:
first instructions for receiving an order for broadband service from said subscriber, including establishing a control dialog between said automation server and a subscriber computer, said establishing including providing an automation agent to said subscriber, said automation agent being configured to configure said subscriber computer to initiate a control dialog with said automation server, wherein said order includes a service option;
second instructions for configuring said automation agent to execute a configuration workflow, including transmitting said workflow to said automation agent via said control dialog, said workflow being based on said service option and including conditions for said subscriber computer to operate over said broadband service, said automation agent being further configure to perform said workflow and to determine broadband service availability information;
third instructions for configuring physical assets of a broadband network by employing said automation server to receive said service availability information from said automation agent, and to configure said physical assets based on said order and said service availability information;
fourth instructions for configuring said subscriber computer by providing to said automation agent, via said control dialog, subscriber and broadband modem configuration information, wherein said automation agent is further configured to provision said subscriber computer and said broadband modem according to said configuration information; and
fifth instructions for transmitting to said automation agent a copy of an extensible service location map of an extensible service bus, wherein said extensible service location map includes a listing of a plurality of extensible services included on said extensible service bus and server location information corresponding to each extensible service of the listing.

26. The automation server as recited in claim 25, wherein said subscriber is located in a geographic region of subscribers newly enabled for broadband network access by an upgrade to said network.

27. The automation server as recited in claim 26, wherein said first instructions include instructions to directly access a broadband deployment database updated after said upgrading.

28. The automation server as recited in claim 25, wherein said first instructions include instructions to provide said automation agent via an internet download to said subscriber.

29. The automation server as recited in claim 25, wherein said service provider provides said automation agent to a computer manufacturer for preloading on said subscriber computer.

30. The automation server as recited in claim 25, wherein said automation agent is configured to configure said subscriber computer for a baseline network access method.

31. The automation server as recited in claim 25, wherein said first instructions include instructions to market, via said automation agent, said broadband service to said subscriber.

32. The automation server as recited in claim 25, wherein said second instructions include instructions to receive a status resulting from said automation agent executing said workflow, and to include said status in a subscriber profile database.

33. The automation server of claim 25, wherein said broadband network is a DSL network.

34. The automation server of claim 33, wherein said workflow includes using a narrowband modem to contact a DSL line qualification server to test a physical line outside the scope of said broadband network, and wherein said service availability information includes DSL subscriber loop characteristics associated with said physical line.

35. The automation server of claim 25, wherein said broadband network is a cable network.

36. The automation server of claim 34, wherein said workflow includes detecting a carrier signal from said cable network and attempting to communicate with said automation server via said cable network, and said service availability information includes a signal strength of said carrier signal or an error code resulting from said attempt.

37. The automation server of claim 25, wherein said broadband network is an ISDN network.

38. The automation server of claim 25, wherein said broadband network is a wireless network.

* * * * *